United States Patent [19]
Marmy

[11] Patent Number: 5,821,460
[45] Date of Patent: Oct. 13, 1998

[54] SAFETY WIRE CONNECTOR FOR STRANDED WIRE

[76] Inventor: Bruce Scott Marmy, 46 Eastman St., Concord, N.H. 03301

[21] Appl. No.: 804,019

[22] Filed: Feb. 21, 1997

[51] Int. Cl.⁶ .................................................... H02G 15/02
[52] U.S. Cl. .......................................... 174/74 A; 174/87
[58] Field of Search ............................... 174/74 R, 74 A, 174/75 B, 75 D, 87; 206/219, 221, 222; 403/214, 268, 270, 396

[56] References Cited

U.S. PATENT DOCUMENTS

| | | | |
|---|---|---|---|
| 3,109,051 | 10/1963 | Vogel | 174/87 |
| 3,483,311 | 12/1969 | McDonald | 174/87 |
| 3,529,075 | 9/1970 | McDonald | 174/87 |

*Primary Examiner*—Kristine L. Kincaid
*Assistant Examiner*—Chau N. Nguyen

[57] ABSTRACT

A less hazardous, reusable and durable wire connector which is designed to connect a plurality of stranded wires without stripping or twisting the ends of the stranded wires. The connector is formed with a plastic base housing and a pliable flapped sheath which will tighten on the wires by a releasable closure restraint. Within the base housing, a pinfield conductive element is provided to connect the stranded wires together.

2 Claims, 3 Drawing Sheets

Fig. 1

SAFETY WIRE CONNECTOR FOR STRANDED WIRE

FIELD OF INVENTION

This invention relates to electrical circuit wiring connectors used in many residential, commercial, and industrial applications.

BACKGROUND OF INVENTION

The need to reduce electrical hazards to both person and property while in the process of wiring or modifying electrical circuits is well known. It is to this often repetitive, and potentially very hazardous task, this invention is directed. Heretofore, the ends of wires had to be stripped of insulation, then with bare metal touching, physically joined in a group, the wire -'nut' connector could be applied. Wire-nut connectors are applied with a twisting action which deform the ends of the wires, rendering them no longer 'new and approved' as required by Underwriters Laboratories. Modifying these connections necessitates the dilemma of cutting off damaged bare wire, and restripping the end of the wire(s) prior to accomplishing wiring modifications. Sometimes circuits are 'live' and must not be turned off. This is when risk to person and property becomes very significant. Sometimes lengths of wire within junction or device boxes do not provide for cutting and restripping wire prior to circuit modification, often resulting in unapproved reapplication of wire-nut on damaged wire.

Thus, those who perform these electrical connections or circuit wiring modifications and those for whom this work is performed will benefit from the enhanced utility and safety this invention provides.

OBJECTS OF THE INVENTION

It is, therefore, a broad object of this invention to enhance the safety of those persons installing and modifying wiring circuitry by providing a wire connector for stranded wire that doesn't require stripping the end of insulation prior to connection. Additionally, it is also an object of this invention to provide the means for more safely performing circuit wiring modifications. It is a further object of this invention to provide a variety of connector sizes for various wiring tasks.

SUMMARY OF THE INVENTION

Briefly, these and other objects of this invention are achieved by a paradigm shift in the purpose and use of wire connectors. In the past, wire connections were more permanently intended, now and in the future, connections while physically secure, must be more readily and safely modifiable.

This invention is valuable in that it allows stranded wires to be connected together without stripping insulation from the ends of the wires. Wires are simply cut to length, individually pushed through chase holes onto a conductive pinfield within the connector then secured by a squeezing of a flapped sheath and cinching tight of a closure restraint.

Connections and reconnections can be accomplished quickly and safely. Consequently, workers enjoy less hazards when working on 'live' circuits and, modifications to wiring is more easily accomplished because wires are not stripped and twisted together (and possibly deformed) in order to use the connector.

DESCRIPTION OF DRAWINGS

The subject matter of this invention is particularly pointed out and distinctly claimed in the concluding portion of the specification. The invention however, both as to organization and method of operation may best be understood by reference to the following description taken in conjunction with the subjoined claims and the accompanying drawings, of which:

DETAILED DESCRIPTION OF THE INVENTION

Figure 1:
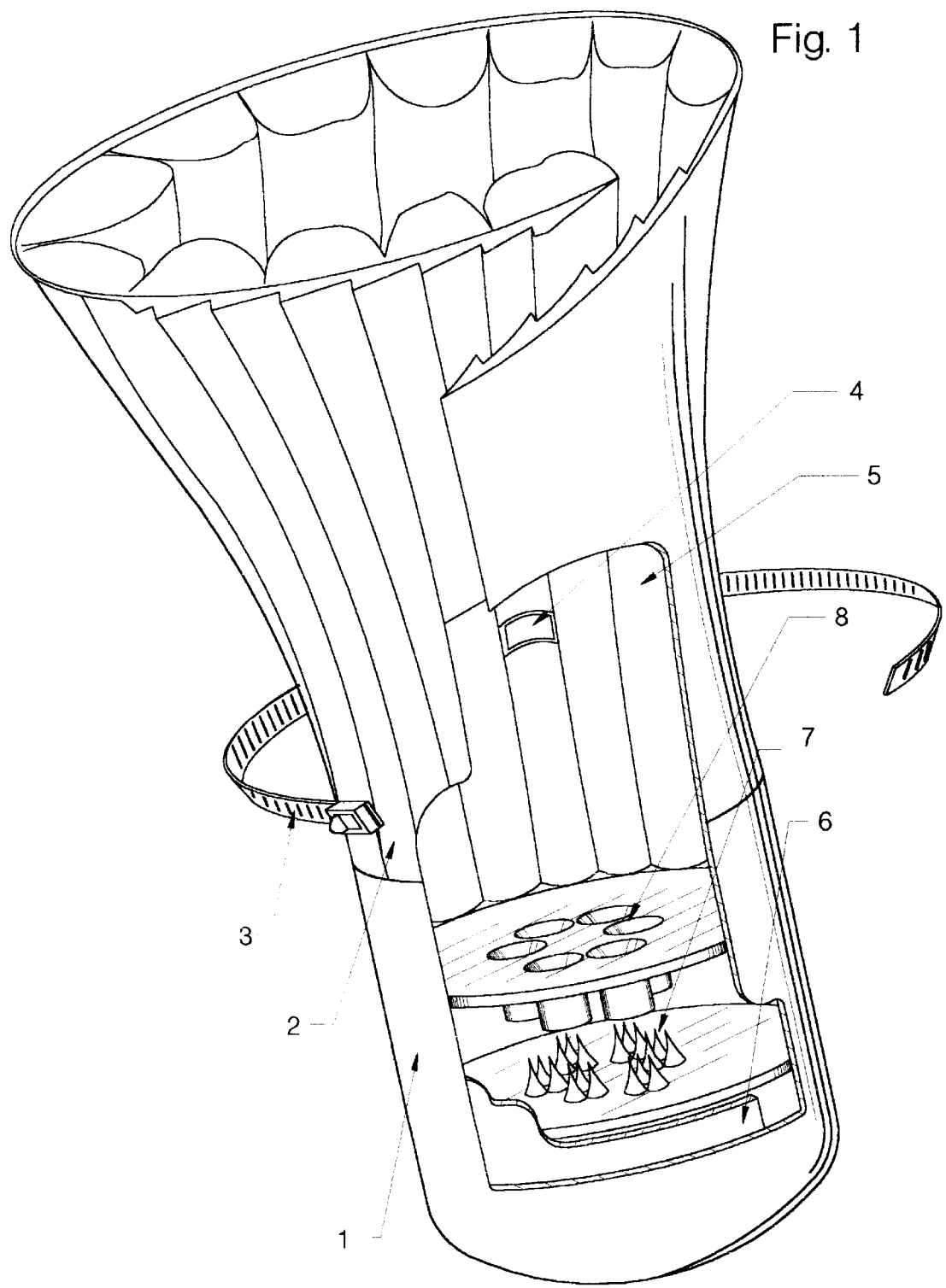
FIG. 1 is a partial, enlarged, not to scale, cut-away pictorial of the Safety Wire Connector For Stranded Wire, shown without the wires to be connected in order to more fully illustrate its general configuration.

Referring now to FIG. 1, the body of the connector <1>, which is sized for stranded wire gauges #14 through #8, is a rigid bell shaped plastic base housing of the same material currently in use for wire connectors. Surrounding, connected to, and rising above the rim of the base housing is the <2> flapped pliable outer sheath comprising approximately ⅔ of the connectors overall length which fully tightens on the wires (not shown) by means of a <3> releasable closure restraint which the worker fastens and cinches tight. When tightened, the sheath has an overlapped region comprising ⅓ of the circumference of the base opening when the connector is fully secured on the wires. A <4> pass through loop is provided in the outer sheath to retain the closure restraint. The inner surface of the sheath is constructed of <5> rows of billowed soft foam which compress very snugly on the wires in the connector. Below the rows of foam the base forms a <6> rigid well. There, securely embedded is the electrically conductive <7> highly resilient 'pinfield'. At the rim of the rigid well is a <8> wire chase, made of the same material as the base housing. The chase has holes in it for the wires to pass through to the pinfield. These holes guide and are sized to provide support for the wire according to the wires' type and size. The pins of the pinfield are oriented around the center of each chase hole providing good contact and the electrical continuity between the wires within the connector.

The electrical connection is safely performed by snugly pushing each cut unstripped stranded wire individually through a chase hole onto the pinfield.

Figure 2:
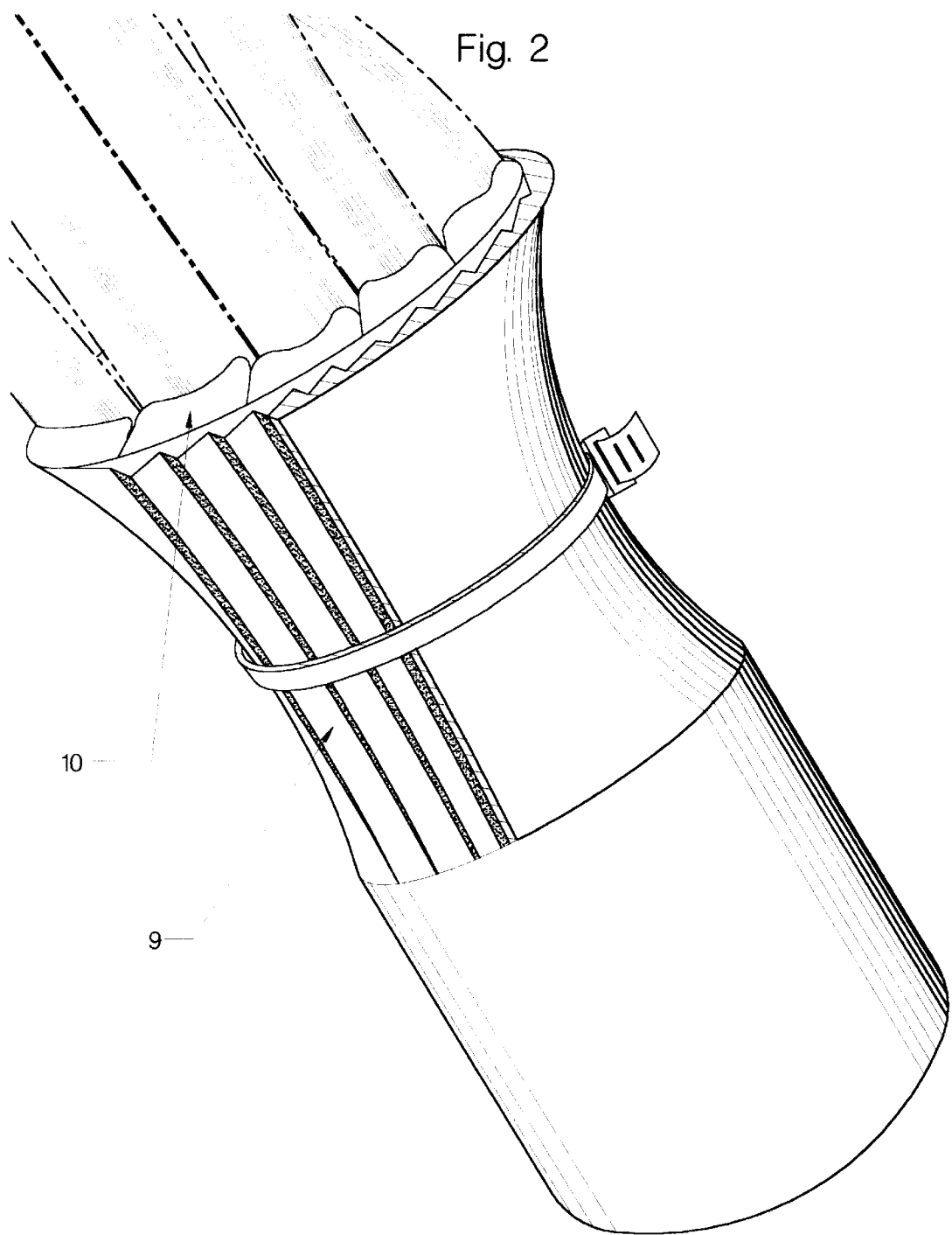
FIG. 2 is an, enlarged, not to scale, pictorial representation of the Safety Wire Connector For Stranded Wire in use, with partial view of wires connected.

Referring now to FIG. 2, all the wires are in the connector, fully secured.

The wire connector is secured first by squeezing the flapped sheath so the <9> molded faces of the sawtooth shaped ratchet and pawl region of the flapped sheath interlock providing initial closure on the wires, then securely fastening the closure restraint will complete the connection. When the wires are fully secured in the connector, the rows of billowed soft foam are <10> quite compressed. This combination of ratcheting teeth, compressed foam, and closure restraint provide secure mechanical connection of the wires in the connector.

Figure 3:
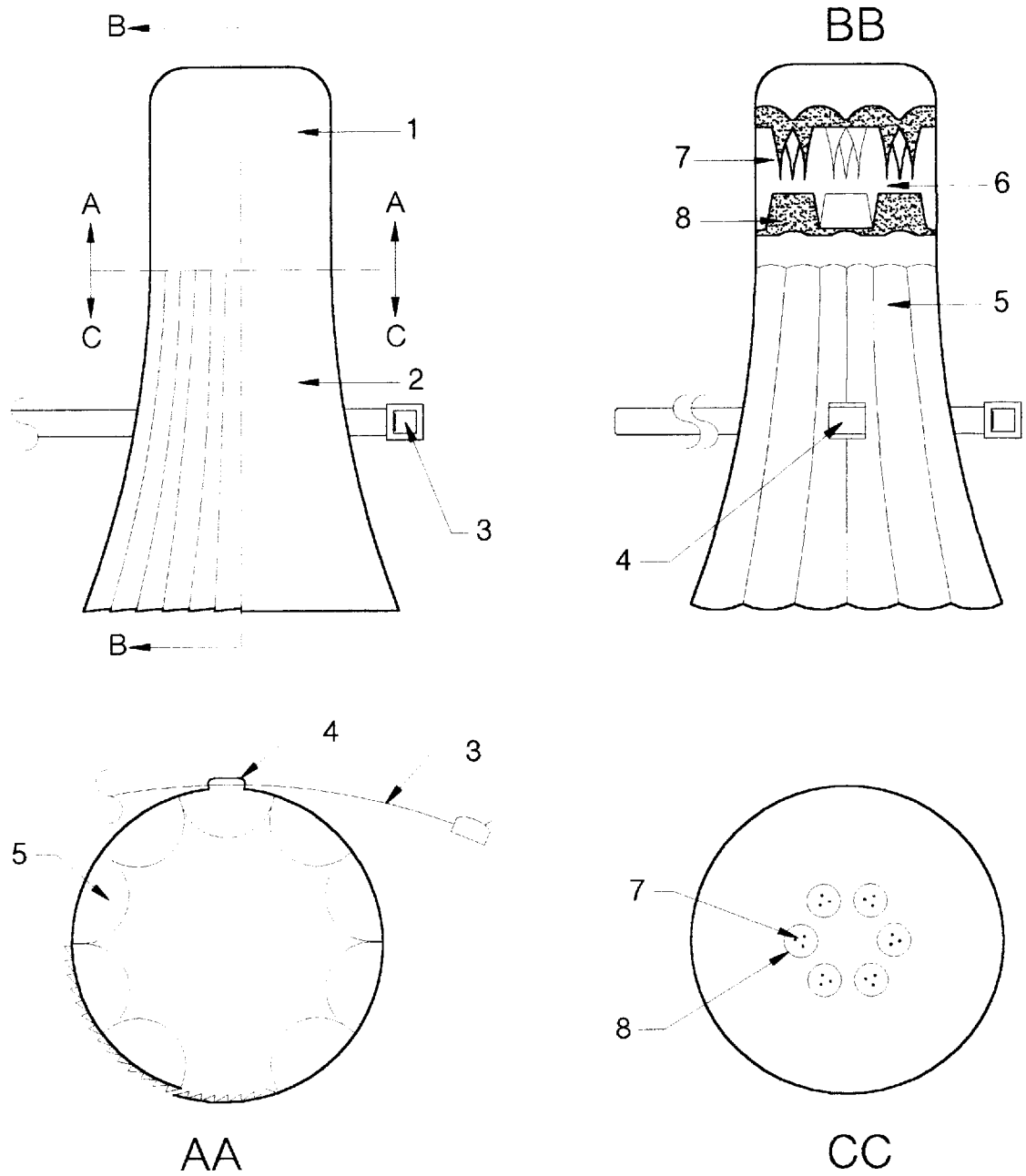
FIG. 3 is a series of enlarged mechanical views, pictorially represented of the Safety Wire Connector For Stranded Wire.

FIG. 3, further illustrates the connector in corresponding numbered mechanical views.

I claim:

1. A wire connector connecting a plurality of stranded wires without stripping and twisting ends of said stranded wires, said stranded wires have a gauge from #14 through #8, said connector comprising: a hardened thermoplastic bell shape base housing, within said base housing securely and permanently embedded, a pinfield conductive element of highly resilient material, tapered and formed as required to withstand connection, disconnection, and reconnection of said stranded wires in the connector, said base housing further comprises a wire chase having the same material as the base housing wherein said wire chase is sized and typed for the stranded wires to be connected, said wire chase also has approximately six holes oriented over pin groups of said pinfield conductive element to guide and support the stranded wires to be connected, said connector further comprising a pliable flapped sheath rising from said base housing and having two thirds of the overall length of the connector, said sheath has an overlapped region comprising one third of the circumference of said base housing when the connector is fully secured on said wires, said overlapped region has ratchet and pawl molded faces provided on upper half of said sheath, also provided on said sheath, a pass through loop opposite the overlapped region, said loop is sized to accommodate the passing through of a reusable closure restraint, said sheath also has a plurality of aligned sponge foam billows vertically coated on the interior surface of said sheath.

2. A connector as claimed in claim 1 is reusable by releasing the closure restraint and prying open the overlapped region of the sheath, any removing, replacing, space permitting, or adding said stranded wires can be performed without affecting the wires in the connector, said connector is resecured by squeezing closed the sheath and refastening the closure restraint.

* * * * *